Dec. 19, 1939.  E. J. WILLIS  2,183,926
ANIMAL TRAP
Filed Aug. 5, 1938   3 Sheets-Sheet 1

Elijah J. Willis,
INVENTOR

BY Victor J. Evans & Co.
ATTORNEYS

Dec. 19, 1939.    E. J. WILLIS    2,183,926
ANIMAL TRAP
Filed Aug. 5, 1938    3 Sheets-Sheet 2

Elijah J. Willis,
INVENTOR

BY Victor J. Evans & Co.
ATTORNEYS

WITNESS

Dec. 19, 1939.  E. J. WILLIS  2,183,926
ANIMAL TRAP
Filed Aug. 5, 1938  3 Sheets-Sheet 3

Elijah J. Willis,
INVENTOR
BY Victor J. Evans & Co.
ATTORNEYS

Patented Dec. 19, 1939

2,183,926

UNITED STATES PATENT OFFICE 2,183,926

ANIMAL TRAP

Elijah J. Willis, Morehead City, N. C., assignor of one-half to Jasper B. Frizzelle, Snow Hill, N. C.

Application August 5, 1938, Serial No. 223,366

4 Claims. (Cl. 43—75)

My invention relates to the destruction of rodents, particularly rats, and includes among its objects and advantages the provision of an improved animal trap.

An object of my invention is to provide an animal trap including a gang of spears which may be present and tripped by the animal, and in which novel means are incorporated for automatically resetting the gang of spears after tripping thereof and destruction of the animal.

A further object is to provide an animal trap including means for spearing the animal in which I provide a novel power operated spear resetting mechanism rendered operable after the trap has been tripped by the animal.

Another object is to provide an animal trap including a spear mechanism for destroying the animal including means for tripping the spear mechanism as the animal enters the trap together with a motor for resetting the spear mechanism after tripping thereof.

Other objects and advantages will be apparent from the following description, appended claims and annexed drawings.

Referring to the drawings wherein like reference characters designate like parts throughout the several views.

Figure 1:
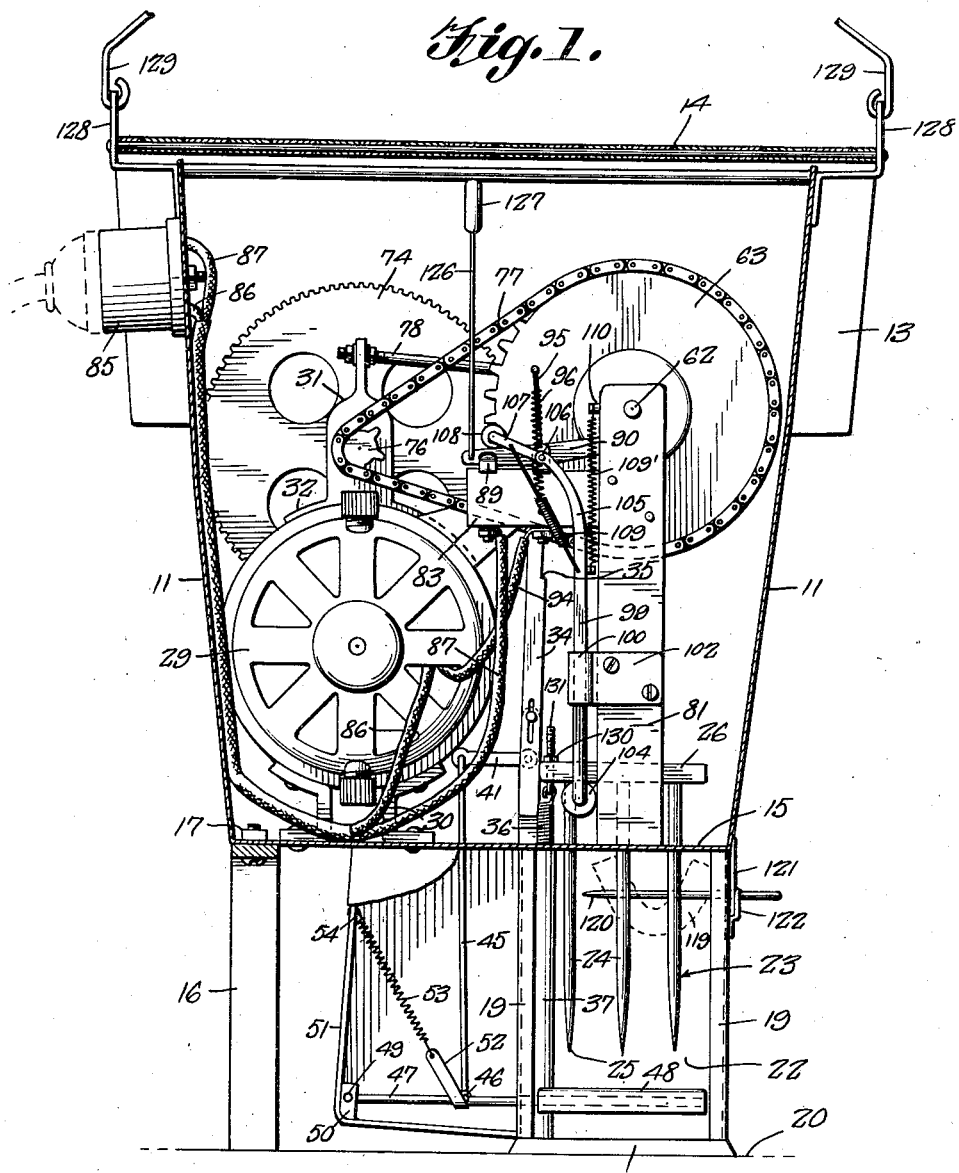
Figure 1 is an elevational view of my animal trap with the housing broken away for the sake of clearness.

In the embodiment selected to illustrate my invention, I make use of a housing 10 including end walls 11 and side walls 12. The side walls include roof plates 13 hingedly connected together at 14. Walls 12 may be pivoted about the axis of the hinge 14 to lend access to the mechanism enclosed within the housing 10. Housing 10 includes a floor 15 which is connected with the end walls 11 for support. I prefer to shape the end walls 11 on the floor 15 from one piece of sheet metal.

Figure 2:
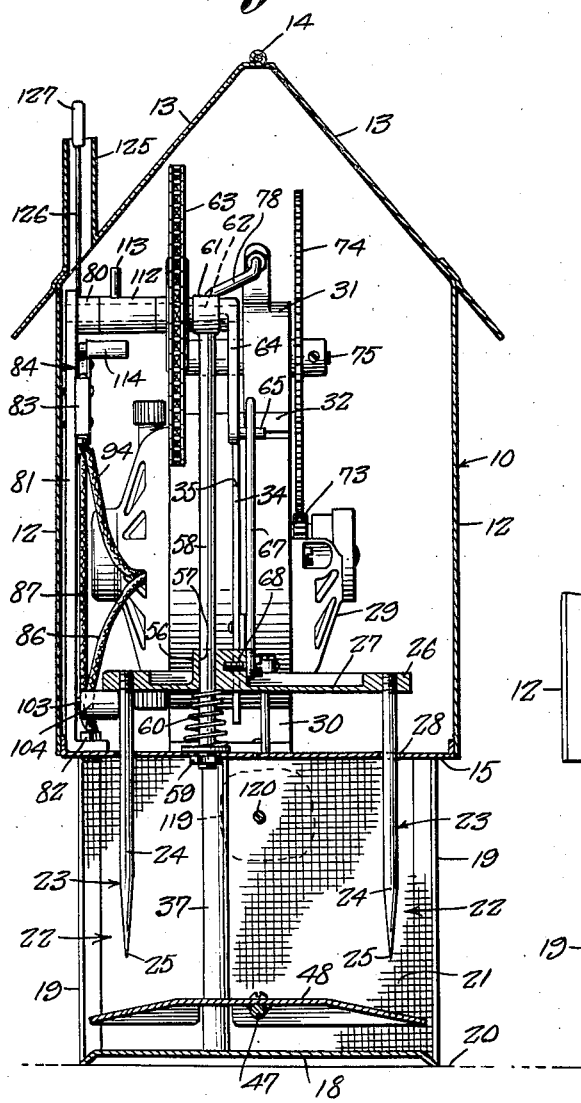
Figure 2 is an end elevational view with the housing illustrated in section.
Figure 7:
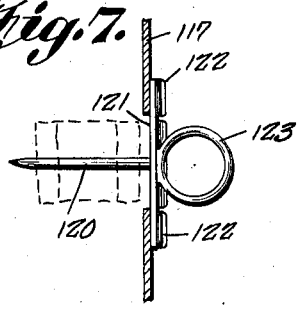
Figure 7 is a sectional view taken along the line 7—7 of Figure 6.

To the floor 15 I connect a pair of legs 16 by bolts 17. A subfloor 18 is connected with the floor 15 through the medium of legs 19. Subfloor 18 and the legs 16 support the housing 10, with the floor 15 held in spaced relation with the floor or ground line 20. Open mesh walls 21 in the nature of screen material are fastened to the legs 19 in such manner as to provide two spaced walls defining entrances 22 for the animal. Operating between the two walls 21 are two gangs of spears 23 which reciprocate in a vertical path. According to Figure 1, each gang of spears 23 comprises three prongs 24 having their lower ends sharpened as at 25 and their upper ends fixedly connected with a head 26. In Figure 2, the heads 26 are interconnected by a plate 27 and the prongs 24 operate through openings 28 in the floor 15. Figures 1 and 2 illustrate the gangs of spears 23 in their tripped positions.

Upon the floor 15 I secure an electric motor 29 through the medium of brackets 30. A bracket 31 is mounted on top the motor 29 and includes flanges 32 which may be welded to the motor. To one of the flanges 32 I weld a bracket 33 to the outer end of which I pivotally connect a latch bar 34. The bar 34 includes a ledge 35 arranged to have latching relation with the plate 27 when it is lifted to the elevated position indicated by dotted lines in Figure 4. In this position of the plate 27 the heads 26 are elevated corresponding distances at which time the sharpened ends 25 of the prongs 24 are positioned slightly underneath the bottom face of the floor 15. One end of a tension spring 36 is connected with the plate 27 and the opposite end of the spring is connected in any suitable manner with the subfloor 18. Spring 36 is enclosed within a tube 37 attached to the floor 15 and the subfloor 18. Plate 27 is elevated against the tension of the spring 36, and shifting of the bar 34 sufficiently forward to bring the ledge 35 into holding relation with the plate 27 permits the spring 36 to drive the gang of spears 23 through the animal positioned between the screened walls 21. Upon the floor 15 I mount a post 39 to which I pivotally connect at 40 a bell crank 41. One end of the bell crank includes a pin 42 extending through a slot 43 in the latch bar 34. The opposite end of the bell crank 41 is pivotally connected at 44 with a link 45 extending through an opening in the floor 15. Referring to Figure 1, the link 45 is pivotally connected at 46 with a lever 47 carrying a trip plate 48 located between the walls 21 and inside the entrances 22. The opposite end of the lever 47 is pivotally connected at 49 with a support 50 anchored to a housing 51 connected with the subfloor 18 and the floor 15. I weld a strap 52 to the lever 47 for anchoring one end of a tension spring 53, the other end of which is secured to the housing 51 as at 54. Spring 53 exerts a pull on the lever 47 for moving the trip plate 48 to its tripping position and at the same time urging the latch bar 34 in the direction of the plate 27. Latch bar 34 is urged against one end of the plate 27, as illustrated in Figure 1, with such engagement determining the tripping position of the trip plate 48 as well as yieldingly holding the ledge 35 in latched relation with the plate 27 in its elevated position.

Figure 4:
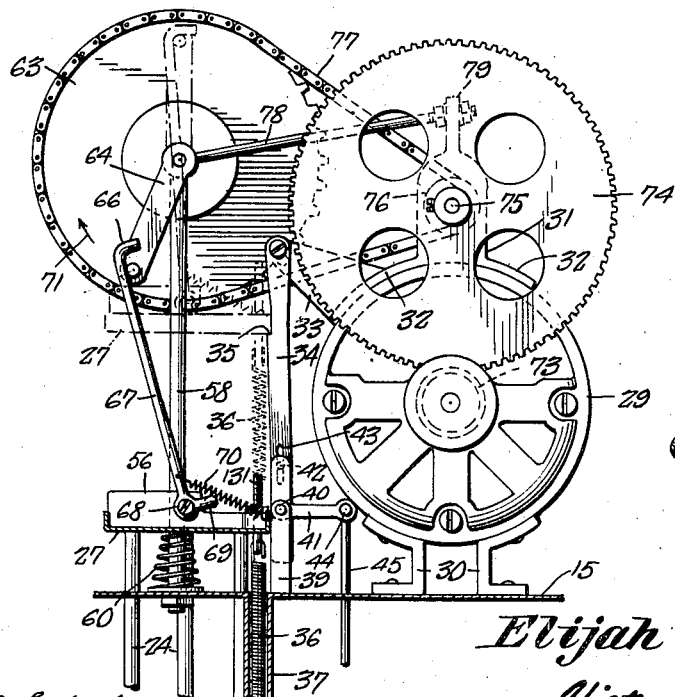
Figure 4 is an enlarged detail view of the motor driven resetting mechanism.
Figure 8:
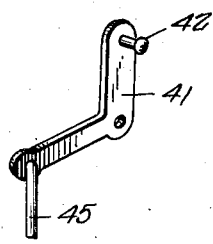
Figure 8 is a perspective view of one detail of the invention.

With the plate 27 positioned in the dotted line illustration of Figure 4, weight of the animal stepping upon the trip plate 48 pulls the link 45 downwardly which in turn pivots the bell crank 41 sufficiently forward to swing the ledge 35 from underneath the plate 27, thus releasing the plate and rendering the spring 36 operative for plunging the gang of spears through the animal. Plate 27 includes a boss 56 having a bore 57 loosely receiving a guide shaft 58 having its lower ends provided with a nut 59 engaging the lower face of the wall 15. Between the wall 15 and the plate 27 I mount a cushioning spring 60, which may embrace the shaft 58. The upper end of the guide shaft 58 is provided with an eye 61 for rotatably supporting a shaft 62 to which I key a large diameter sprocket wheel 63. A resetting crank 64 is keyed to the shaft 62 and includes a right-angular pin 65 arranged to have connected relation with a hook 66 carried by a bar 67 pivotally connected at 68 with the boss 56 on the plate 27. Normally the bar 67 extends into vertical position from the plate 27. The bar includes an arm 69 arranged to engage the plate 27 when pivoted to a vertical position through the medium of the spring 70. The tension spring 70 has one end connected with the bar 67 and its opposite end connected with the plate 27 for urging the bar to its vertical position. Normally the resetting crank 64 lies in the dotted line position of Figure 4. Rotation of the resetting arm 64 in the direction of the arrow 71 through the medium of the sprocket 63 causes the pin 65 to engage the hook 66 and elevates the plate 27 for bringing it into the dotted line illustration of Figure 4. When brought to this position, the ledge 35 moves under the plate 27. At the moment the ledge 35 passes underneath the plate 27 the rod 67 has been elevated and shifted to the dotted line illustration of Figure 4. Further rotation of the sprocket 63 moves the pin 65 out of holding relation with the hook 66, but the ledge 35 supports the plate 27 in the elevated position.

Motor 29 includes a pinion 73 arranged in mesh with a large diameter gear 74 keyed to a shaft 75 rotatably journaled in the bracket 31. Shaft 75 is keyed to a small sprocket 76 for connection with the sprocket chain 77 connected with the large sprocket 63. Pinion 73, of the gear 74, the sprocket 76, chain 77, and the sprocket 63 constitute a transmission unit for operatively connecting the motor 29 with the arm 64, which elevates the gangs of spears 23.

A bar 78 has one end connected with the eye 61 and its opposite end connected with the bracket 31 as at 79. Since the bracket 31 is fixedly connected with the motor 29 the bar 78 will lend rigidity to the upper end of the guide shaft 58.

Figure 5:
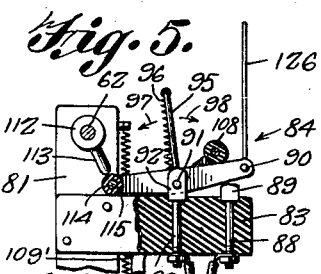
Figure 5 is a sectional detail view of the bridge for closing the circuit through the motor after the spear mechanism has been tripped.

The gangs of spears 23 may be set manually by lifting the plate 27 upwardly through the medium of the rod 67. When set, the circuit through the motor 29 is opened, but tripping of the trap closes the circuit through the motor for resetting the spears, after which the circuit of the motor is broken until such time as the trap may again be tripped. The eye 61 of the guide rod 58 constitutes a bearing for one end of the shaft 62 while the opposite end of the shaft is journaled in a bearing 80 carried by an upright post 81 bolted at 82 to the floor 15. Post 81 carries a right-angular bar 83 of insulating material, which bar serves as a mount for the switch assembly 84 which controls the motor 29. One of the walls 11 carries an outlet plug 85 to which are electrically connected the wires 86 and 87. Plug 85 may be connected with an outside source of current in the conventional manner. Wire 86 leads to the motor 29, while the wire 87 is electrically connected with a terminal 88 passing through the bar 83 and anchored thereto. Terminal 88 carries spaced ears 89 located to have electrical connection with the blade 90 pivoted at 91 on the bifurcated end 92 of a terminal 93 to which one end of a wire 94 is connected. The opposite end of the wire leads to the motor 29. It will thus be seen that the position of the blade 90 controls the operation of the motor 29. Blade 90 is fixedly connected with a right-angular arm 95 to the outer end of which I connect one end of a tension spring 96, the other end of the tension spring being connected with the bar 83. With the blade 90 positioned according to Figure 5, the spring 96 exerts a pull upon the arm 95 in the direction of the arrow 97, but the blade 90 is restrained from further pivotal movement beyond the position illustrated because of its engagement with the arm 83. When the blade 90 is pressed between the ears 89 the spring 96 will exert a pull on the arm 95 in the direction of the arrow 98, thus holding the blade in a circuit closing position until it is again shifted to its full length position of Figure 5.

Figure 1 illustrates a shaft 99 slidably supported by a tube 100 formed on the end of the bracket 102 bolted to the post 81. The lower end of the shaft 99 includes a right-angular reach 103 upon which I mount a rubber sleeve 104 located underneath the plate 27. The upper end of the shaft 99 is bowed as at 105 and is pivotally connected at 106 with a kicker arm 107 having a right-angular reach upon which I mount a rubber sleeve 108 for driving the blade 90 into circuit closing relation with the ears 89.

A tension spring 109 is connected at one end with the bar 99 and at its opposite end with the kicker arm 107. One end of a tension spring 109' is connected with the bar 99 and its opposite end is connected with a pin 110 carried by the post 81. Upon the shaft 62 I key a sleeve 112 which carries a pin 113 arranged to engage the rubber sleeve 114 mounted on the right-angular reach 115 carried by the blade 90. Sleeve 114 is located to be engaged by the pin 113 for pivoting the blade 90 out of electrical relation with the ears 89 immediately after the plate 27 has been lifted into latched relation with the ledge 35.

Figure 6:
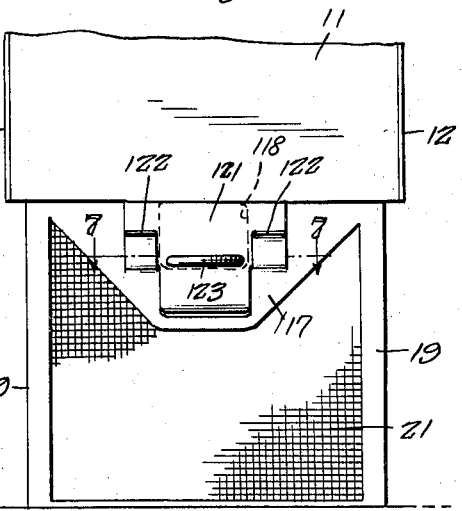
Figure 6 is a detail view of the bait mount.
Figure 3:
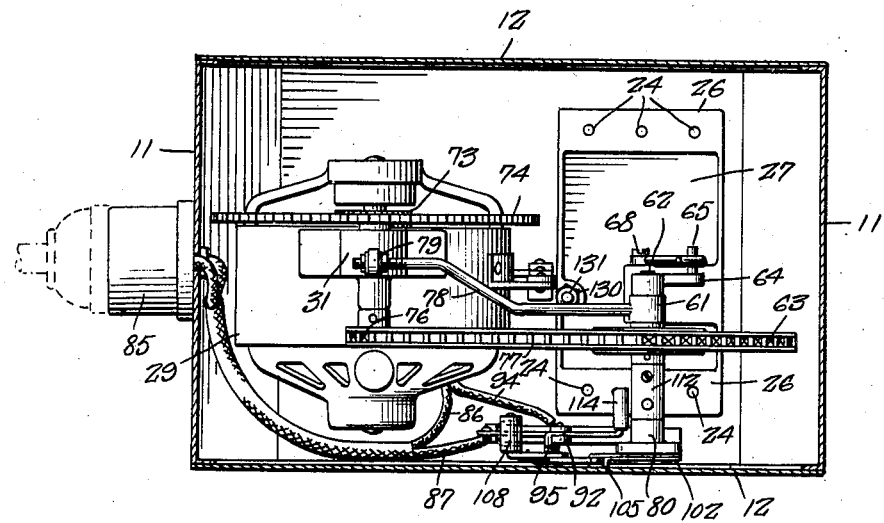
Figure 3 is a top plan view with the upper part of the housing removed.

Two of the legs 19 carry a plate 117 which is provided with an opening 118 constituting a door for the bait 119. Bait 119 is mounted on a pale 120 fixedly related to a plate 121. Two ears 122 are formed from material of the plate 117 for supporting the plate 121 in the position of Figure 6.

The plate 121 may be provided with a loop 123 through which a finger may be inserted for bait removing and placing purposes. The bait is located midway between the two gangs of spears 23, so that the animal must step upon the trip plate 48 before it can reach the bait.

From the foregoing description of the various parts of the device the operation thereof will be readily understood. When first set up, the spears are manually elevated for bringing the plate 27 into latched relation with the ledge 35. With the bait 119 in position, the trap is ready for use. As the animal steps upon the trip plate 48 the bellcrank 41 is pivoted for swinging the latch bar 34 sufficiently forward to bring the ledge 35 clear of the plate 27. Immediately upon such clearance the spring 36 drives the gangs of spears 23 downwardly. At least one gang of the spears will be driven through the animal. As the plate 27 is driven downwardly, it strikes the sleeve 104 on the rod 99. Downward movement of the rod 99 causes the sleeve 108 to strike the blade 90 for driving the same between the ears 89, thus closing the circuit to the motor 29. Arm 107 is hinged to the bar 99 so as to dampen the impact. As the blade is driven home the spring 95 is shifted to one side of the pivotal axis 91 of the blade 90 so that the blade will be held in contacting relation with the ears 89.

As the motor 29 is energized, it is set in operation for elevating the gangs of blades and establishing latched relation between the plate 27 and the ledge 35. As the gear 74 is rotated the pin 65 on the arm 64 engages the hook 66 and elevates the gangs of blades. When the rod 67 has reached a vertical position the arm 69 contacts the plate 27 to prevent further movement of the arm. At the same time the pin 113 engages the sleeve 114 for moving the blade 90 to the position of Figure 5 at which time the circuit through the motor is broken. The circuit is broken at such time as to permit the pin 65 to move in the clear of the hook 66 thus permitting the spears to drop as soon as the trip plate 48 is touched by another animal.

The spears 23, while being driven through the animal, are withdrawn therefrom as the spears are elevated, and the reflex action of the animal will cause it to move to a position entirely in the clear of either entrance 22. It will thus be seen that I have provided a trap which is effective in dismounting the animal and in which the trap is entirely automatic and will continue operating so long as is desired.

Elevation of the plate 27 for resetting purposes removes pressure from the sleeve 104, thus rendering the spring 109 effective for elevating the rod 99. Such elevation of the rod decreases the pressure relation between the arm 107 and the blade 90. After the plate 27 has been fully elevated, the pin 113 engages the sleeve 114 for pivoting the blade 90 to the position of Figure 5. Under such conditions the tension of the spring 96 effectively holds the blade in the position illustrated, even though the pin 113 has moved slightly beyond the sleeve 114. When fully elevated, the arm 107 has very little, if any, pressure relation with the blade 90, so that the tension of the spring 96 will effectively hold the blade 90 in its open position, until such time as the trap may be tripped.

One of the roof plates 13 is provided with a tube 125 for accommodating a wire 126 connected with one end of the blade 90. The outer end of the wire is provided with a grip 127 of insulating material. Grip 127 is accessible from a position exteriorly of the roof of the housing, to permit manual manipulation of the switch. A bail may be attached to the housing to facilitate handling thereof. In Figure 1 I have illustrated the end walls 11 as being provided with ears 128 to which the ends 129 of a bail may be connected. Ears 128 may be welded to the walls 11.

The tension of the spring 36 may be changed by adjustment of the nut 130 threaded to the shaft 131 to which one end of the spring is connected.

I claim:

1. An animal trap comprising a baited entrance, animal spearing means including a driving means for said spearing means, animal actuated trip means for holding the spearing means in driving position, an electric motor, an operating connection between the electric motor and the spearing means for returning the latter to its driving position after being tripped by an animal, and a normally open switch for the electric motor and having an operating connection with said spearing means for closing the switch after tripping said spearing means and for opening the switch after return of the spearing means to said driving position.

2. An animal trap comprising a baited entrance, a supporting member having a plurality of spears connected therewith, resilient means operatively connected with said supporting member for driving the spears, animal actuated trip means cooperable with said supporting member for holding the spears in driving position, an electric motor, an operating connection between the electric motor and said supporting member for returning the spears to said driving position after being tripped by an animal, a normally open switch for the electric motor and having an operating connection with said supporting member for closing the switch after tripping said spears, and means actuated by the motor for opening the switch after return of the spears to said driving position.

3. An animal trap comprising a baited entrance, a supporting member having spear elements connected therewith, a spring operatively connected with said supporting member for driving the spear elements, animal actuated trip means for holding the supporting member and the spear elements in driving position, an electric motor, a hooked link connected with said support, rotative means operatively connected with said motor and cooperating with said hooked link for returning the supporting member and the spear elements to said driving position after being tripped by an animal, a normally open switch for the motor and having an operating connection with said supporting member for closing the switch after tripping said supporting member and the spear elements, and means actuated by the motor for opening the switch after return of the supporting member and the spear elements to said driving position.

4. An animal trap comprising a housing including a baited entrance, said housing including a floor and said baited entrance being positioned underneath said floor, said floor being provided with openings, spears including a plate member for supporting the spears located inside said housing with the spears adapted to be projected through said openings, a trip plate located in said baited entrance, a trip mechanism connecting said trip plate with said first plate for holding the latter and said spears in driving position, a spring operatively connected with said first plate for driving the spears into said baited entrance, an electric motor mounted on said floor inside the housing, an operating connection between the electric motor and said first plate for returning the latter and said spears to said driving position after being tripped by an animal, and a normally open switch for the electric motor and having an operating connection with said first plate for closing the switch after tripping said first plate, and rotative means operatively connected with said motor and operatively connected with said switch for opening the switch after return of said first plate and said spears to said driving position.

ELIJAH J. WILLIS.